June 24, 1941.                E. D. DALL                2,246,786
              AUTOMOBILE DOOR LOCKING STRUCTURE
              Filed March 13, 1940           2 Sheets-Sheet 1
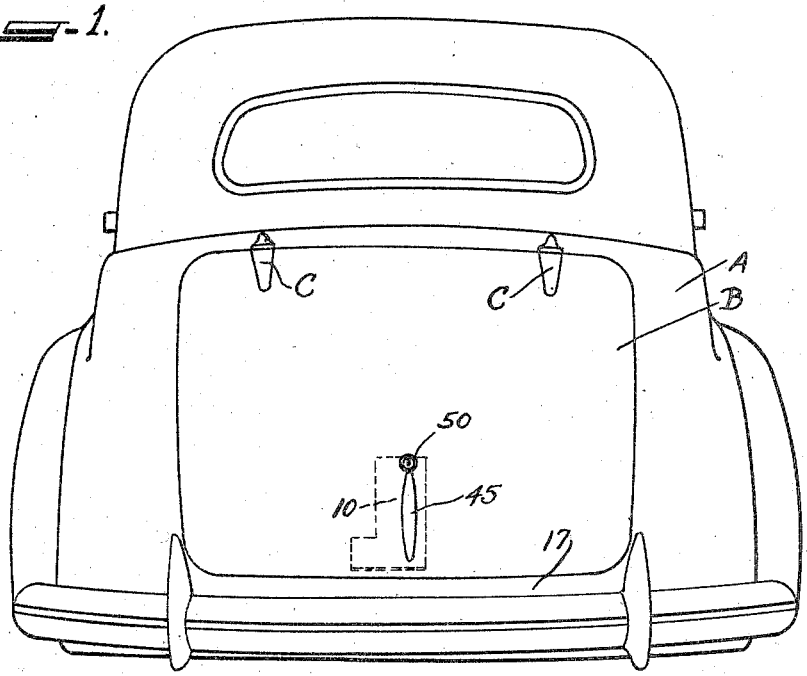
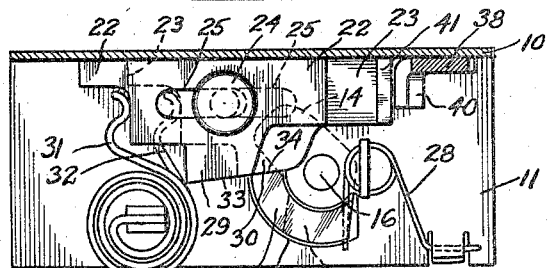
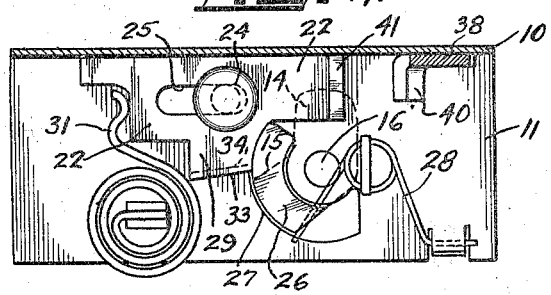
Inventor
Edward D. Dall.

June 24, 1941.  E. D. DALL  2,246,786
AUTOMOBILE DOOR LOCKING STRUCTURE
Filed March 13, 1940  2 Sheets-Sheet 2
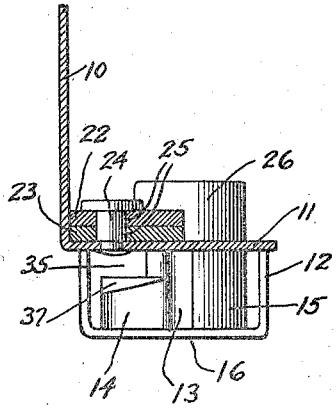
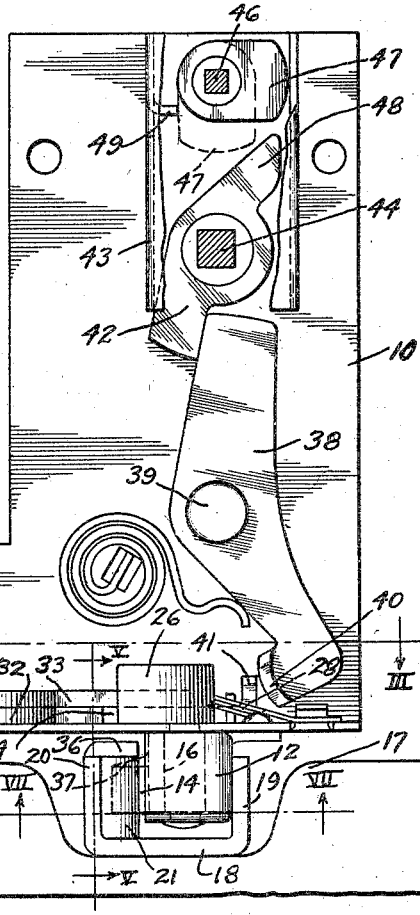
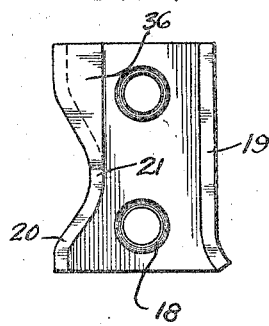
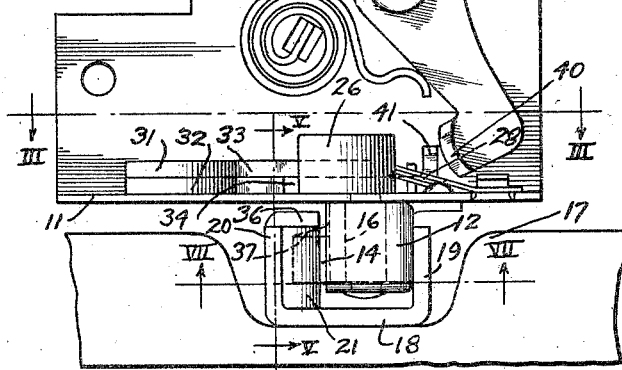
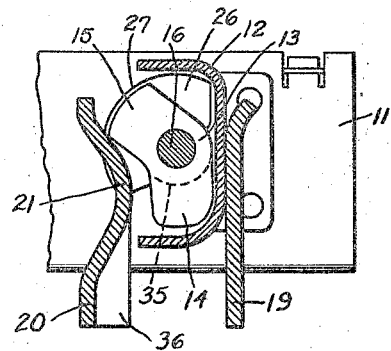
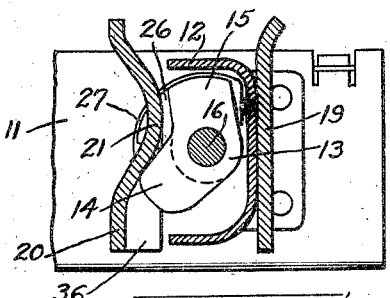
EDWARD D. DALL.

Patented June 24, 1941

2,246,786

UNITED STATES PATENT OFFICE 2,246,786

AUTOMOBILE DOOR LOCKING STRUCTURE

Edward D. Dall, Detroit, Mich., assignor to Houdaille-Hershey Corporation, Detroit, Mich., a corporation of Michigan Application March 13, 1940, Serial No. 323,712

3 Claims. (Cl. 292—198)

My invention relates to locking structure for automobile doors and was designed more particularly for use on a vertically swinging door but can be used with equal advantage on other types of doors.

Lock structures have been provided for the upwardly swinging door of the trunk or baggage compartment at the rear end of an automobile body but with such prior locking structure the door soon became loose enough for longitudinal and transverse movement or oscillation and also up and down movement, causing the door to rattle and become noisy during travel of the vehicle. Furthermore, with such prior locking structures, it was possible to insert a tool between the door edge and the sill and the door pried away from the sill sufficiently for release of the latch or locking bolt for unlawful entry.

In the case of doors on the convertible top or touring type of automobiles, where a doorway is not connected across the top by a body part, the doorway may spread under strain of travel of the vehicle so that the latch or lock bolt will not properly engage to hold the door securely closed against rattling.

The important object of my invention is to provide simple and improved locking structure, preferably of the rocking latch bolt type, so designed that the latch bolt will cooperate with the keeper to hold the door at all times snugly closed against noisy movement, and also to prevent the door from being pried away from the sill for unlawful opening thereof.

The various features of my invention are incorporated in the structures shown on the drawings, in which drawings:

Figure 1 is a rear elevation of an automobile body showing a trunk or baggage compartment door to which my improved locking structure is applied;

Figure 2 is a front elevation of the lock structure on the door and the keeper structure on the door frame;

Figure 3 is a section on plane III—III Figure 2 showing the locking structure in latching position;

Figure 4 is a sectional view similar to Figure 3 showing the latch bolt in unlatching or cocked position;

Figure 5 is a section on plane V—V Figure 2;

Figure 6 is a top view of the keeper element;

Figure 7 is a section on plane VII—VII Figure 2 showing the latch bolt in latching position; and Figure 8 is a section similar to Figure 7 but showing the latch bolt in cocked position and entering the keeper when the door is swung to closed position.

On Figure 1, A represents the car body and B the trunk compartment door hinged at its upper edge to the car body by suitable hinge structure C.

The lock structure on the door comprises a plate 10 having the flange 11 at its lower end. Secured to the outer side of the flange to extend crosswise thereof is a rectangular oblong cup shaped housing 12 which houses the latch bolt 13. The latch bolt is of V-shape to provide a latching leg 14 and a setting leg 15. The bolt is rockable on a pin 16 secured at its ends to the flange 11 and the outer wall of the housing 12.

Securely affixed in the sill 17 below the door is a keeper element 18 of U-shape cross section whose one flange 19 is straight but whose other flange 20 is deflected inwardly to provide a latching abutment 21 for cooperation with the latch bolt when the door is swung to its closed position for passage of the housing 12 into the keeper element. When the latch bolt is in unlatched or cocked position as shown on Figures 4 and 8, the latching leg of the bolt will be within the housing and the setting leg 15 will extend diagonally a distance from the housing, and when the door is swung toward its closed position as indicated on Figure 8, the setting leg 15 of the bolt encounters the latching abutment 21 on the keeper and the bolt will be rocked into its latching position shown on Figures 2, 3, and 7. When the door is swung open after release of the latch bolt, the latch bolt will be returned to its unlatching or cocked position.

Means in the form of outer and inner holding members 22 and 23 are provided for holding the latch bolt in either its cocked or latching position. These latching members are in the form of plates engaging with their rear edges against the plate 10 and are further guided for lateral movement on the flange 11 by a guide post 24 on the flange and extending through longitudinally extending slots 25 in the holding members.

The latch bolt has an arcuate lug 26 extending inwardly through an arcuate slot 27 in the flange 11, the lug and the slot being concentric with the rocking axis of the latch bolt. A spring 28 anchored on the flange 11 engages against the outer end of the lug 26 and tends to rock the latch bolt to its unlatched or cocked position shown on Figures 4 and 8. The holding members 22 and 23 have forwardly extending wings 29 and 30 respectively and when the latch bolt is in its unlatching or cocked position the side edges of these wings will be held against the arcuate outer side of the bolt lug 26 under pressure of springs 31 and 32 bearing against the ends of the holding members as clearly shown on Figure 4 and this engagement of the holding members with the latch bolt lug will assist the spring 28 in holding the latch bolt in its unlatching or cocked position.

When the door is swung into closed position for engagement of the latch bolt with the keeper and rocking thereof into latching position, the inner end of the lug 26 will clear the holding members so that the springs may shift these holding members laterally for engagement of their wings 29 and 30 behind the latch bolt abutment to hold the latch bolt in its latching position. The outer edges 33 and 34 of the outer and inner holding members 22 and 23 respectively are inclined to provide cam surfaces, and when the latch bolt is rocked toward its latching position when the door is swung to closed position, these wedging surfaces will engage with the inner end of the bolt lug 26 and exert wedging pressure thereagainst so as to force the latch bolt around for its final latching movement until the door is securely closed against its seat. One holding member with a long wedging surface might be employed, but it is more practical to employ two holding members as shown and to have the wedging surfaces thereof engage successively with the bolt lug. In the arrangement shown, the wedging surface 34 of the inner holding member is a distance behind the wedging surface of the outer holding member when these holding members are in their outer position, so that when these holding members are released when the latch bolt is swung toward latching position, the wedging surface 34 of the inner holding member will first engage with the lug 26 and then the wedging surface 33 of the outer holding member will come into wedging engagement with the lug, as clearly shown on Figure 3. Compressible sealing strips are usually provided on the seat of an automobile door and, with the latch bolt arrangement shown, the wedging action exerted against the latch bolt will force the latch bolt around the latching abutment of the keeper so as to hold the door securely seated against the sealing material and to take up any slack and to hold the door securely closed, and sealed. When the latch bolt is thus held securely in its latching position by engagement of the latch bolt leg 14 with the keeper abutment 21, the latch bolt housing 12 will be seated against the flange 19 of the keeper and the door will thus be securely held against lateral movement or oscillation on the door sill when the vehicle is in service.

Provision should also be made to hold the door securely to the sill 17 so that the door cannot be pried open by the insertion of a tool between the door lower edge and sill. I have therefore provided an arrangement in which the latch bolt, when it moves to its latching position, will interlock with the keeper to lock the door down to the sill. Referring to Figure 5, the latching leg 14 of the latch bolt has its inner portion cut away to leave the recess 35 for receiving the keeper lip 36 extending inwardly from the flange 20 of the keeper 18 rearwardly of the latching abutment 21, as clearly shown on Figures 6, 7 and 8. When the door is swung toward its closed position and the bolt is rocked into latching engagement with the latching abutment 21, the latching leg 14 in front of the recess 35 will be swung into position below the keeper lip 36 so that when the door is latched, as shown on Figure 7, the door will be locked down to the sill so that it cannot be pried up from the sill for withdrawal of the latch bolt from the keeper and unlawful opening of the door. The bolt leg 14 may be beveled adjacent to the recess 35 as indicated at 37 so that it may readily engage under the keeper lip 36 and exert more or less camming or drawing action as the door is moved to its finally closed position to thus draw the door down toward the sill and hold the door against longitudinal displacement or oscillation during service of the vehicle. Thus my improved locking structure will hold the door securely against its sealing seat and will also hold it against lateral or longitudinal shifting or rattling when the vehicle is traveling.

Describing now the means for releasing the latching structure for opening of the door, a releasing lever 38 is fulcrumed on a post 39 extending from the plate 10. At its lower end, the lever is deflected to form an abutment 40 for engagement with the foot 41 formed by deflecting the end of the inner holding member 23. Above the lever 38 a roll-back is confined between the plate 10 and a cover plate 43 and is mounted on a spindle 44 to the outer end of which is secured a door handle 45. When the door is latched shut and the latch bolt is held in its latching position by the holding members 22 and 23, the foot 41 of the holding member 23 will be alongside of the abutment 40 on the lever 38. Now when the handle 45 is turned in counterclockwise direction, the rollback will rock the lever 38 in clockwise direction and the abutment 40 will shift the inner holding member back to its normal position, and when the foot reaches the end of the outer holding member 22 this member will be shifted with the inner member and both holding members will be shifted until the inner edges of their wings clear the lock bolt abutment lug 26 to free the latch bolt so that the door may be swung open. Then when the handle is released the springs 31 and 32 will shift the holding members with their wings in engagement with the outer side of the bolt lug 26 to hold the latch bolt in its unlatching or cocked position.

Means are provided for dogging the roll-back 42 so that the door handle cannot be operated to unlatch the door. As shown on Figure 2, a spindle 46 carries a detent arm 47 which, when the spindle is in its normal position, will extend laterally toward the right out of the path of an arm 48 on the roll-back so that the roll-back may be operated by the door handle. However, when the spindle 46 is turned to swing the detent or dogging arm 47 downwardly against a stop 49, the roll-back will be dogged and the handle will be locked against releasing of the latching mechanism. The turning of the spindle 46 is preferably controlled by key operable tumbler lock means 50 at the outside of the door, as shown on Figure 1.

My improved locking structure may be advantageously used on the side doors of an automobile to hold the doors snugly seated in closed position and against vertical and longitudinal shift in the door frame. In automobiles of the convertible top or touring type, where the doorways are not spanned at the top by automobile body parts, my improved lock structure would materially assist in preventing spreading of the doorways.

I have shown and described practical and efficient embodiments of the features of my invention but I do not desire to be limited to the exact construction, arrangement and operation shown and described as changes and modifications may be made without departing from the scope of the invention.

I claim as follows:

1. Locking structure for a hinged automobile door comprising a keeper at the edge of the door jamb, a rockable latch bolt on the door for entering said keeper when the free edge of the door is moved to closed position, a latching abutment on the keeper with which the end of said latch bolt cooperates to be rocked into latching engagement with the keeper for holding the door closed, a cam surface on the side of said bolt, and a second abutment on said keeper with which said cam surface has camming pressure engagement when it is rocked to latching position whereby the door edge will be drawn toward the jamb edge when the door is closed.

2. Locking structure for the hinged door of an automobile comprising a keeper member extending transversely of the door jamb, a housing extending transversely of the free edge of the door for entering said keeper when the door is swung to closed position, a latching abutment on said keeper, a latching bolt rockable in said housing for engagement with said latching abutment to be rocked thereby into latching position to hold the door against opening movement, spring-pressed wedge means engaging said bolt after latching engagement thereof with said keeper and tending to rock said bolt in engagement with said abutment to force and to hold the door fully closed, a cam formation on the side of said bolt, and a second abutment on said keeper with which said cam formation has camming pressure engagement as said bolt is forced to latching position whereby said door will be drawn toward the jamb and separation of the door edge away from the jamb prevented.

3. Locking structure for the hinged door of an automobile comprising a keeper having a side wall extending transversely of the edge of the door jamb, a housing extending transversely of the free edge of the door for entering said keeper when the door is swung to closed position, a camming abutment on said keeper side wall, a latch bolt having a latching arm, means for rocking said bolt in said housing for engagement of the end of said latch arm with said camming abutment to thereby latch the door against opening movement, a second abutment on said keeper side wall, a cam surface on the side of said latching arm, and spring pressed means effective to engage said bolt after latching movement thereof for forcing said bolt into tight latching engagement with said camming abutment to hold the door fully closed and for forcing said cam surface into pressure engagement with said second abutment in such manner that the door will be drawn in its plane toward the jamb edge and separation of the door edge from the jamb edge prevented.

EDWARD D. DALL.